Figure 1:
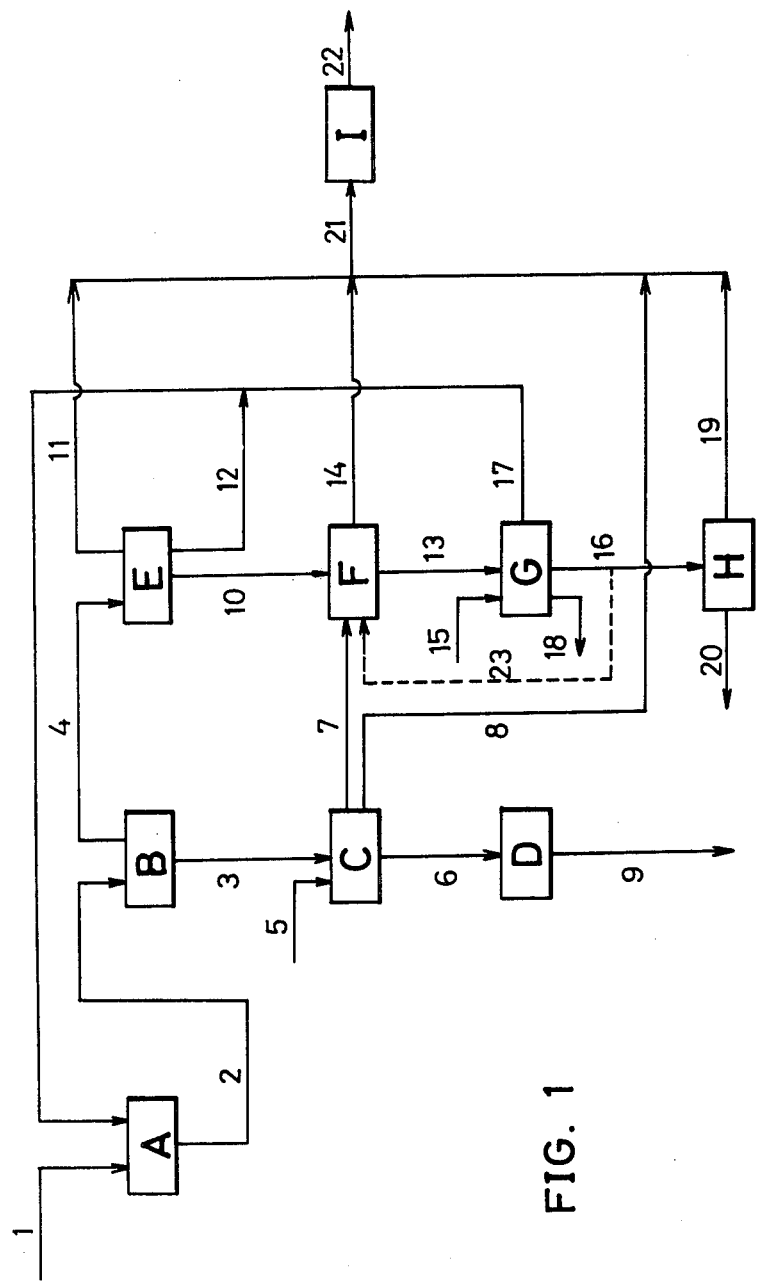

United States Patent [19]

Yamada et al.

[11] 4,201,749

[45] May 6, 1980

[54] METHOD FOR THE SEPARATION OF PRECIPITATED ALUMINUM HYDROXIDE FROM SODIUM ALUMINATE SOLUTION

[75] Inventors: Koichi Yamada; Takuo Harato; Hisakatsu Kato, all of Niihama, Japan

[73] Assignee: Sumitomo Aluminium Smelting Company, Ltd., Osaka, Japan

[21] Appl. No.: 37,145

[22] Filed: May 8, 1979

[30] Foreign Application Priority Data

May 8, 1978 [JP] Japan .................................. 53-54803

[51] Int. Cl.$^2$ .............................................. C01F 7/14
[52] U.S. Cl. .................................... 423/127; 423/119; 423/121; 423/130; 423/630; 23/301; 23/305 A
[58] Field of Search ............... 423/119, 121, 127, 130, 423/630; 23/301, 305 A

[56] References Cited

U.S. PATENT DOCUMENTS

| 2,707,669 | 5/1955 | Houston et al. | 423/630 |
| 2,935,376 | 5/1960 | Roberts | 423/119 |
| 3,372,985 | 3/1968 | Roberts et al. | 423/127 |
| 3,486,850 | 12/1969 | Day | 423/127 |
| 3,649,185 | 3/1972 | Sato et al. | 423/600 |
| 3,838,980 | 10/1974 | Gnyra | 423/119 |
| 4,038,039 | 7/1977 | Carnitheas et al. | 423/121 |

*Primary Examiner*—Herbert T. Carter
*Attorney, Agent, or Firm*—Wenderoth, Lind & Ponack

[57] ABSTRACT

In the production of alumina from aluminous ores by the Bayer process, the present invention provides an improvement for effectively and economically recovering caustic components consisting essentially of sodium aluminate from aluminum hydroxide cakes as seed classified from the product aluminum hydroxide by washing the seed with a washing liquor having a substantially saturated concentration of sodium oxalate and little content of caustic and then removing organic substances such as sodium oxalate from the washed seed by secondly washing said seed with hot water, thereby recovering caustic components without the dissolution of sodium oxalate from the seed into the recovered caustic solution and attaining the removal of sodium oxalate contaminant with high efficiency.

6 Claims, 1 Drawing Figure

METHOD FOR THE SEPARATION OF PRECIPITATED ALUMINUM HYDROXIDE FROM SODIUM ALUMINATE SOLUTION

The present invention relates to a method for the production of alumina from aluminous ores by the Bayer process or improved processes thereof (hereinafter inclusively referred to as the Bayer process). More particularly, it relates to a method for the effective washing of precipitated aluminum hydroxide prior to adding the hydroxide as seed to a clarified sodium aluminate solution for the precipitation of aluminum hydroxide in the Bayer process.

As is well known, the production of alumina by the Bayer process comprises the steps of treating aluminous ores such as bauxite (hereinafter referred to as bauxite) with a hot caustic solution such as a caustic soda solution at a temperature generally above 130° C. to extract the alumina portions contained in bauxite (the digestion step); separating undissolved residues such as iron oxide, silicates, titanium oxide and the like as red mud from the slurry obtained in the digestion step (the red mud sedimentation step); adding aluminum hydroxide as seed to a clarified sodium aluminate solution after the separation of the undissolved residues (hereinafter referred to as the Bayer solution) to precipitate aluminum hydroxide at a temperature generally of 50° to 70° C. (the precipitation step); separating the precipitated aluminum hydroxide from the sodium aluminate solution (the separation step); recycling a portion of separated aluminum hydroxide precipitate as seed to the precipitation step; and withdrawing the remaining portion of separated aluminum hydroxide precipitate as product, while recycling the sodium aluminate solution after the separation of aluminum hydroxide precipitate (hereinafter referred to as the spent liquor), as it is or after evaporated, to the digestion step for bauxite.

Generally, bauxite contains organic substances mainly composed of humus, and these substances dissolve, as they are or as soluble salts, in the sodium aluminate solution in the digestion step for bauxite. Further, a flocculating agent such as starch or a high molecular weight coagulant, e.g. sodium polyacrylate, is added to the slurry solution obtained in the digestion step. Consequently, organic substances are gradually accumulated in the circulated sodium aluminate solution of the Bayer process or the spent liquor of the Bayer process.

The organic substances in the Bayer solution are present in various forms from humus to final decomposition products thereof such as sodium oxalate. Of these organic substances, those having a low solubility in the sodium aluminate solution of the Bayer process (hereinafter referred to as sodium oxalate representatively) precipitate, as crystals or as adsorbed to the surface of precipitated aluminum hydroxide, in the precipitation step. When such aluminum hydroxide with sodium oxalate adsorbed is recycled as seed to the precipitation step, the growth of aluminum hydroxide crystal is hindered, so that aluminum hydroxide precipitate having a large grain size can not be produced. Also, aluminum hydroxide withdrawn as product is contaminated with sodium oxalate, which results in the lowering of purity. Further, the accumulated organic substances hinder the sedimentation of red mud and the separation of precipitated aluminum hydroxide from the sodium aluminate solution, thereby markedly lowering the efficiency of alumina production.

In order to remove organic substances, e.g. sodium oxalate, from aluminum hydroxide withdrawn as product or aluminum hydroxide used by recycling as seed for the precipitation step of the Bayer process, various methods have so far been proposed as follows: A method in which the precipitated aluminum hydroxide obtained in the separation step is washed with hot water to dissolve sodium oxalate adsorbed on or contained in it; and a method in which the seed aluminum hydroxide classified from the precipitated aluminum hydroxide is washed with cold water and then with hot water to dissolve sodium oxalate (Japanese Patent Publication No. 11480/1973). The former method is not economical because valuable sodium aluminate accompanied with the precipitated aluminum hydroxide is also lost at the same time with the removal of sodium oxalate. While in the latter method, a loss in sodium aluminate is decreased since sodium aluminate accompanied with the seed aluminum hydroxide is recovered by washing with cold water. But problems still remain even by such method, for example, a large quantity of heat is necessary to elevate the temperature of the recovered cold water containing sodium aluminate to that of the spent liquor circulating through the Bayer process; and sodium oxalate also dissolves in the recovered liquor to some degree even though the washing water is cold.

In a commercialized Bayer process, it is necessary to remove sodium oxalate through any procedure of the Bayer process stationarily in order to prevent the accumulation of sodium oxalate contaminant in the Bayer process. In such case, when the removal of sodium oxalate is carried out by the aforesaid latter method wherein sodium aluminate accompanied with the precipitated aluminum hydroxide as seed is first recovered by washing with cold water and then sodium oxalate contaminant is removed by washing with hot water, the amount of the seed aluminum hydroxide to be washed should be determined taking into account the amount of sodium oxalate which is dissolved in cold water used for the recovery of accompanying sodium aluminate and returned to the Bayer process, which results in an increase of the amount of water for washing. Besides, a large amount of cold water is required for sufficient recovery of sodium aluminate, and therefore recycling the recovered washing liquor, as it is, to the Bayer process causes the lowering of sodium aluminate concentration in the process. As a result, a large-sized evaporator for controlling liquor balance in the Bayer process and a large quantity of heat are required, so that such method is not always suitable.

The present inventors extensively studied to find a method for efficiently removing organic substances, e.g. sodium oxalate, from the seed aluminum hydroxide with as little loss in sodium aluminate and little water for washing as possible, which has no drawbacks described above. As a result, it was found that such the washing liquor for the recovery of sodium aluminate from the seed hydroxide as described below is effective for achieving the aforesaid object: A liquor having a substantially saturated concentration of sodium oxalate and little content of caustic, for example the recovered washing liquor drained through the washing step of the product aluminum hydroxide, i.e. a dilute caustic solution having a substantially saturated, or saturated concentration of sodium oxalate. That is, in the production of alumina for aluminous ores, e.g. bauxite, with the Bayer process, the present inventors found the present invention which attains to the effective and economical removal of sodium oxalate contaminant with a small amount of washing liquor and the lowering of sodium aluminate loss by firstly washing the seed hydroxide with a washing liquor having a substantially saturated concentration of sodium oxalate and little content of caustic, thereby lowering the content of accompanying sodium aluminate to the caustic concentration of the washing liquor, and then washing the seed with hot water.

That is, in the production of alumina from aluminous ores, e.g. bauxite, by the Bayer process, more particularly in a process for separating precipitated aluminum hydroxide from a sodium aluminate solution by adding aluminum hydroxide as seed to a clarified aqueous solution of sodium aluminate to precipitate aluminum hydroxide, recycling a portion of the precipitated aluminum hydroxide, as seed, to the precipitation step for aluminum hydroxide, and washing the remaining portion of precipitated aluminum hydroxide, thereby withdrawing said aluminum hydroxide as product, the present invention provides an improvement for effectively and economically recovering caustic components and removing a predetermined amount of sodium oxalate contaminant from the seed aluminum hydroxide which comprises washing the seed aluminum hydroxide with a washing liquor having a substantially saturated concentration of sodium oxalate and little content of caustic to recover accompanying sodium aluminate therein, and secondly washing the seed with hot water, then recycling as seed for the precipitation step of aluminum hydroxide.

The present invention will be illustrated in detail hereinafter.

In the present invention, a washing liquor having a substantially saturated concentration of sodium oxalate and little content of caustic is used for washing the seed aluminum hydroxide to recover accompanying sodium aluminate. As such a washing liquor, there may be given a recovered washing liquor from the washing of product aluminum hydroxide, and a liquor drained from any stage of a sodium oxalate-removing procedure complicated in the Bayer process, although said liquor is somewhat inferior to said recovered washing liquor in efficiency at which organic substances such as sodium oxalate are removed. Typical examples of the latter liquor will be shown with reference to the flow sheet of the present process described hereinafter: A sodium oxalate-containing, dilute sodium aluminate solution obtained through the washing step G for the seed aluminum hydroxide; a sodium oxalate-containing liquor obtained by filtering sodium oxalate cakes from the sodium aluminate solution separated at the classification step E and treated with a suitable method for the removal of sodium oxalate therein and dissolving said cakes in hot water; a sodium oxalate-containing liquor obtained by precipitating sodium oxalate from the sodium aluminate solution obtained through the evaporation step I, separating the sodium oxalate cakes by filtration and dissolving said cakes in hot water. Further, these liquors may be used as mixtures thereof, of mixtures with fresh water. Of these liquors, the recovered washing liquor from the washing of product aluminum hydroxide is more efficient and economical. Next, explanation will be given to the typical embodiment wherein said recovered washing liquor is used.

Hitherto, the washing of product aluminum hydroxide is practised subjecting the product aluminum hydroxide slurry separated from the sodium aluminate solution at the separation step of the Bayer process to drainage treatment thereby obtaining aluminum hydroxide cake having a liquor content of for example about 10% by weight, followed by multi-stage washing with water. Equipments generally used for said drainage and washing treatment include horizontal table-form filters, disc filters and the like. This type of equipment generally has a rotary, single filtering surface comprising a drainage section and multi-stage washing sections. The sodium aluminate-containing liquor and washing liquor which are recovered by the drainage and washing treatment of product aluminum hydroxide slurry contain valuable components, so that they are generally mixed, evaporated if necessary and recycled to the Bayer process.

In the process of the present invention, the seed classified from the precipitated aluminum hydroxide is washed with a washing liquor having a substantially saturated concentration of sodium oxalate and little content of caustic, generally with a recovered washing liquor withdrawn from the washing of product aluminum hydroxide.

In order to achieve this embodiment of the present invention, it is suitable that the drainage and washing treatment is operated by such a manner that the recovered liquor from the drainage section having a relatively high caustic concentration and the recovered washing liquor purged from the washing of product aluminum hydroxide cake with water are separately withdrawn. Particularly, a preferred one in respect with the effective recovery of valuable caustic is such that said recovered washing liquor can be withdrawn to divide into two portions, one having a relatively high caustic concentration which is obtained by freshly washing the product hydroxide cake prepared by the drainage treatment and contains a large amount of sodium aluminate and the other having a relatively low alkali concentration which is obtained by washing said product hydroxide cake at the latter stages. Particularly in the present invention, the latter is distinguished from the other recovered washing liquor, being called "dilute liquor." Of course, the washing of the product hydroxide may also be carried out as follows without simply dividing into two portions: By determining the change in a caustic concentration and sodium oxalate concentration of the washing liquor discharged from the multi-stage washing section, a required amount of the dilute liquor having a suitable condition is withdrawn selectively and used for washing the seed aluminum hydroxide.

By the investigation on a typical, commercialized Bayer process, it was found that the recovered washing liquor from said drainage and washing step of the product hydroxide generally contains 5–50 g/l. of sodium aluminate (as $Na_2O$) and 3–40 g/l. of organic substances (as $Na_2C_2O_4$), having a temperature of from about 40° to 90° C. depending upon the operation conditions, and that said washing liquor has a substantially saturated concentration of sodium oxalate, as it is or after cooling. For example, in the case of the washing liquor at a temperature of 60° C. having 20 g/l. of caustic concentration (as $Na_2O$), the saturated concentration of $Na_2C_2O_4$ is about 26 g/l., and it shows a tendency to decrease as an increase in the caustic concentration and a lowering in the liquor temperature.

Thus, the recovered washing liquor from the washing of product aluminum hydroxide has a substantially saturated concentration of sodium oxalate or a concentration of sodium oxalate easily converted to a saturated state by cooling. Consequently, by washing the seed aluminum hydroxide with such recovered washing liquor, most of sodium aluminate accompanyed therewith can be recovered, while sodium oxalate adsorbed thereon hardly dissolves in the liquor, because of said liquor having a substantially saturated concentration of sodium oxalate. Therefore, substantially all of sodium oxalate can be removed at the subsequent sodium oxalate-removing step.

That is, the process according to the present invention enables the recovery of valuable sodium aluminate and removal of sodium oxalate contaminant with a small amount of water for washing by employing the washing technique in which the seed is washed with a recovered washing liquor discharged from the washing of the product hydroxide. Further, the process of the present invention will be illustrated more specifically with reference to the accompanying drawing, which is only given for the purpose of illustration and not to be interpreted as limiting the invention thereto.

FIG. 1 shows the schematic diagram of the Bayer process having a precipitation step A, classification steps B and E, a drainage and washing step C for product aluminum hydroxide, a calcination step D, washing steps F and G for seed aluminum hydroxide, a causticization step H for sodium oxalate and an evaporation step I.

In the drawing, a sodium aluminate solution from the digestion step of the Bayer process (not shown) is introduced into the precipitation step A through a line 1. The precipitation step is generally constructed with a plural number of precipitation tanks, and the sodium aluminate solution introduced is seeded to add aluminum hydroxide particles and holded under stirring for about 1 to about 3 days to precipitate aluminum hydroxide.

The slurry containing precipitated aluminum hydroxide withdrawn from the precipitation step is introduced into the classification step B through a line 2 and classified into product aluminum hydroxide slurry having a liquor content of usually 30 to 70% by weight and seed aluminum hydroxide slurry. The product slurry is charged into the drainage and washing step C through a line 3, while the seed slurry is charged into the classification step E through a line 4.

In general, the product slurry introduced into the step C contains 100 to 200 g/l. of caustic (as $Na_2O$), depending upon the kind of aluminous ores and operation conditions. Further, solid aluminum hydroxide in the slurry is contaminated with organic substances, e.g. sodium oxalate, deposited thereon and contained therein, the content of which is about 0.1 to 10% by weight (as $Na_2C_2O_4$) based on the solid matter contained in the slurry. Thus, the purpose of the drainage and washing treatment for the product slurry is to recover valuable caustic component, i.e. sodium aluminate, and to remove sodium oxalate contaminant.

The product slurry introduced into the step C is converted, by drainage treatment, to cake having a liquor content of less than about 10% by weight, and then washed with hot water supplied through a line 5. The water may be any one not to contaminate product aluminum hydroxide and not to contain any substance which cause troubles during circulation in the Bayer process. Usually, hot water of 40° C. or higher, preferably 50° to 90° C., for example a heated industrial water or a drain discharged from the Bayer process may be used.

The amount of water for washing depends upon the purity of product aluminum hydroxide, but generally it should be such that the sodium aluminate solution accompanying the drained aluminum hydroxide cake and sodium oxalate deposited on and contained in the cake can substantially be washed off, or it should be at least equal to or more than the liquor amount contained in the cake introduced into the washing section of the step C. Generally speaking, it may be not less than about 10% by weight, preferably not less than 20% by weight, based on the cake.

As a filtering and washing equipment used in the step C, there may be used any of those which attain a high efficiency of drainage and uniform washing, but preferred ones are such that the recovered liquor from the drainage section and the recovered washing liquor discharged from the washing section of the step C can separately be withdrawn. Further, it is desirable that the washing section is constructed with a counter-current multi-stage washing system for the efficient use of water for washing. This type of filtering and washing equipment includes a horizontal table-form filter, a disc filter and the like.

The sodium aluminate solution recovered at the drainage section and a portion of the washing liquor recovered from washing with hot water at the washing section of the step C are discharged through a line 8, introduced, directly or after passed through a sodium oxalate-removing step (not shown), into the evaporation step I, concentrated and then recycled to the Bayer process. The remaining portion of the recovered washing liquor or the dilute liquor withdrawn from a specified washing section of the step C and having a relatively low concentration of caustic is introduced into the washing step F for the seed through a line 7. The washed product aluminum hydroxide is charged into the calcination step D through a line 6, and after calcined, it is withdrawn as alumina, a final product, through a line 9.

On the other hand, the slurry comprising aluminum hydroxide as seed and a sodium aluminate solution, separated at the classification step B is introduced into the classification step E through a line 4.

The classification step E is generally constructed with a thickner, a cyclone separator, a filter, or combination thereof. The slurry introduced into this step is classified into seed aluminum hydroxide slurry and a sodium aluminate solution containing fine aluminum hydroxide particles. A predetermined amount of the seed aluminum hydroxide is charged into the washing step F through a line 10, and the remaining portion is recycled to the precipitation step A through a line 12. The sodium aluminate solution classified at the step E is recycled, directly or after concentrated at the evaporation step I, to the digestion step through lines 11 and 21 wherein it is reused for the extraction of alumina from bauxite.

The seed aluminum hydroxide charged into the washing step F is washed with a washing liquor specified in the present invention, generally the recovered washing liquor, preferably the dilute liquor, which is introduced through a line 7 from the drainage and washing step C for the product aluminum hydroxide.

The seed hydroxide slurry charged into the step F from the step E through a line 10 comprises a sodium aluminate solution containing 100 to 200 g/l. of caustic (as $Na_2O$) and aluminum hydroxide particles contaminated with organic substances, e.g. sodium oxalate, deposited thereon and contained therein, the content of which is 0.1 to 20% by weight (as $Na_2C_2O_4$) based on the solid matter contained in the slurry, depending upon the kind of aluminous ores and operation conditions.

The effect of the present invention becomes more fruitful with the decrease of the caustic concentration of a washing liquor used for washing the seed hydroxide to recover valuable caustic omponents as well as the approach to saturation of the sodium oxalate concentration thereof. Accordingly, it is preferable to select such a washing liquor satisfying the above conditions from the drainage and washing step C. It is however economically advantageous to use such a liquor having a saturation of 0.5 or more, preferably 0.7 or more, of sodium oxalate and a caustic concentration of 50 g/l. or less (as $Na_2O$).

It is sufficient that the washing liquor used for the recovery of caustic at the step F is used in such an amount that the sodium sluminate concentration of a liquor attached to the seed aluminum hydroxide after washing is substantially equal to that of the washing liquor. Generally, the amount of washing liquor is about 10% by weight or more, preferably about 20% by weight or more, based on the solid matter of the seed slurry introduced through a line 10.

Further, the washing liquor introduced through a line 7 may be used after prepared by a suitable cooling means in order to increase the saturation degree of sodium oxalate therein. In the present invention, the saturation degree of sodium oxalate refers to the concentration ratio of sodium oxalate present in a washing liquor used for firstly washing the seed, to sodium oxalate soluble in said liquor at the equilibrium state.

According to the present invention, when the seed aluminum hydroxide is washed with a washing liquor specified in the present invention to recover the caustic accompanying therein into said liquor, the dissolution of sodium oxalate deposited thereon into said washing liquor hardly occurs. Consequently, 60 to 95% of sodium aluminate accompanying with the seed aluminum hydroxide can be recovered without the substantially dissolving sodium oxalate into the washing liquor.

The washing liquor withdrawn from the washing step F is recycled, directly or after concentrated at the evaporation step I, to the digestion step through lines 14 and 21 for the extraction of alumina from bauxite. The seed washed at the step F is introduced into the second washing step G through a line 13.

In the second washing step G for the seed, the seed hydroxide substantially free from sodium aluminate accompanying therein is washed with hot water introduced through a line 15 to remove sodium oxalate therefrom. Thereafter, the seed substantially free from sodium oxalate is separated from the washing liquor containing sodium oxalate dissolved therein. Generally, this operation is carried out by the well-known means, for example using a filter means equipped with a washer device, or a proper system comprising a vessel equiped with a stirrer for dissolving sodium oxalate deposited on the seed into warm water (hereinafter referred to as repulping vessel) and a separator for separating washing liquor from the seed. In the latter system, the fine aluminum hydroxide as seed is introduced into the repulping vessel through a line 13 and dipped in hot water of about 50° to 90° C. entering through a line 15, and sodium oxalate deposited thereon is dissolved into hot water. Then, the seed hydroxide substantially free from sodium oxalate is separated from the washing liquor containing sodium oxalate by a separator.

The separated seed aluminum hydroxide is recycled to the precipitation step A through a line 17 and used as seed for the precipitation of aluminum hydroxide crystals. When the seed hydroxide is left, it may be withdrawn as the product aluminum hydroxide. On the other hand, the washing liquor containing sodium oxalate withdrawn from the step G may be purged through a line 18, or may be treated as follows: It is introduced into the causticization step H through a line 16; sodium oxalate in the liquor is converted to a water-insoluble matter with addition of a chemical substance capable of reacting with sodium oxalate; and then the water-insoluble matter is separated and removed. Generally, such chemical substance includes limes such as quick lime and slaked lime. But a substance giving no adverse effect on the Bayer process, for example barium hydroxide, may be used. Also, it may be possible to add a strong alkali, e.g. sodium hydroxide, to the washing liquor withdrawn, thereby to deposit sodium oxalate therefrom.

The sodium oxalate-free washing liquor thus obtained is introduced into the evaporation step I through lines 19 and 21, then recycled into the Bayer process, or introduced into a red mud washing system (not shown) as a washing liquor. On the other hand, the water-insoluble matter, oxalic acid compounds, is withdrawn through a line 20. It may be converted to oxalic acid compounds having a high value by a suitable preparation and applied to a proper usage.

The foregoing explanation was given to the flow sheet in FIG. 1 including two classification steps B and E. So far as the concept of the present invention is not lost, the classifier used in the steps may be a single unit or combination of two units or more. Further, in the foregoing explanation, a washing liquor used in the washing step F was the recovered washing liquor or dilute liquor from the washing of product aluminum hydroxide. But, said washing liquor may be replaced by its mixture with fresh water.

By the present invention as described above, the effective washing of seed aluminum hydroxide, an object of the present invention, can be achieved. But in addition to this, the following effects, which are of very high industrial value, can be obtained:

1. In comparison with the conventional methods for the washing of seed aluminum hydroxide, most of sodium aluminate accompanying in the seed can be recovered without being substantially accompanied by organic substances such as sodium oxalate.

2. In comparison with the conventional methods for recovering sodium aluminate by firstly washing the seed aluminum hydroxide with cold water, the amount of washing liquor entering the Bayer system is so little that the quantity of energy necessary for evaporation can extremely be decreased.

3. In comparison with said washing methods with cold water, the efficiency of removal of sodium oxalate per unit weight of seed aluminum hydroxide is large.

Next, the present invention will be illustrated in detail with reference to the following examples, which are not however to be interpreted as limiting the invention thereto.

EXAMPLE 1

One liter of an aluminum hydroxide slurry as seed (sodium oxalate content, 2% by weight based on the solid matter; the caustic concentration of the sodium aluminate solution, 125 g/l. (as Na₂O)) having a solid concentration of 684 g/l., which was obtained by the classification of the seed aluminum hydroxide (the classification step E) according to the flow sheet of the Bayer process shown in FIG. 1, was vacuum-filtered at 60° C. to carry out solid/liquid separation. Thereafter, 170 ml of a dilute liquor (60° C.; caustic concentration 25 g/l. (as Na₂O); sodium oxalate content, 22 g/l.) comprising a dilute sodium aluminate solution recovered at the washing step C for the product aluminum hydroxide, was poured onto the above separated aluminum hydroxide cake as seed (liquor content, 24.9% by weight) on the filter, and sodium aluminate in the cake was recovered by suction-filtering.

The cake was added into 500 ml of hot water (60° C.), and sodium oxalate contained in the cake was dissolved in the hot water with stirring, followed by filtering. The filtrate was analyzed for sodium oxalate therein. The result is shown in Table 1.

COMPARATIVE EXAMPLE 1

Procedure was carried out in the same manner as in Example 1 except that, in the first washing of the seed aluminum hydroxide, 170 ml of the dilute liquor was replaced by the same volume of cold fresh water (17° C.). The filtrate obtained after secondly washing with hot water was analyzed for sodium oxalate dissolved. The result is shown in Table 1.

|  | Analysis of Filtrate | | |
|---|---|---|---|
|  | Na₂O (g/l) | Sodium oxalate (g/l) | Ratio of Na₂O/ sodium oxalate |
| Example 1 | 9.3 | 25.8 | 0.36 |
| Comparative Example | 6.3 | 15.3 | 0.41 |

It is apparent from Table 1 that, according to the present invention, a substantial amount of valuable sodium aluminate can be recovered with no addition of fresh water for firstly washing, and besides that sodium oxalate deposited on the seed aluminum hydroxide can almost be removed therefrom.

EXAMPLE 2

One liter of the same aluminum hydroxide slurry as in Example 1 was vacuum-filtered at 60° C. to carry out solid/liquid separation. Thereafter, 340 ml each of the two portions of a dilute liquor (Na₂O, 25 g/l; sodium oxalate content, 15 g/l.), one being at 60° C. and the other being at 40° C., comprising a dilute sodium aluminate solution obtained at the washing step C for the product aluminum hydroxide, was poured onto the above separated aluminum hydroxide cake on the filter, and sodium aluminate in the cake was recovered by suction-filtering the dilute liquor. One dilute liquor at a temperature of 60° C. had a saturation degree of 0.7 of sodium oxalate, and the other at a temperature of 40° C. was substantially saturated. In the same manner as in Example 1, the cake was added into 500 ml. of hot water (60° C.), and sodium oxalate contained in the cake was dissolved in the hot water with stirring, followed by filtering. The filtrate was analyzed for the caustic concentration (as Na₂O) and sodium oxalate content therein. The results are shown in Table 2.

Table 2

| Temperature of washing liquor at the first washing | Analysis of filtrate | | Ratio of Na₂O to sodium oxalate |
|---|---|---|---|
|  | Na₂O (g/l) | Sodium oxalate (g/l) |  |
| 60° C. | 5.8 | 22.2 | 0.26 |
| 40° C. | 5.8 | 24.5 | 0.24 |

The followings are apparent from Table 2. Even by washing with the dilute sodium aluminate solution, of which the sodium oxalate concentration does not reach saturation, the efficiency of removal of sodium oxalate is higher than in Comparative Example 1 although some sodium oxalate is dissolved. In washing with the dilute liquor (40° C.) having an elevated saturation degree of sodium oxalate, the efficiency of removal of sodium oxalate is higher than in washing with the other dilute liquor (60° C.). Thus, it is understandable that the removal of sodium oxalate becomes more efficient as an increase in the saturation degree of sodium oxalate in the washing liquor.

EXAMPLE 3

A dilute sodium aluminate solution containing sodium oxalate, which was obtained at the washing step of aluminum hydroxide as seed (the washing step G in FIG. 1), was used for the seed washing as described below.

One liter of the same aluminum hydroxide slurry as in Example 1 was vacuum-filtered at the washing step F shown in FIG. 1 for the seed aluminum hydroxide to carry out solid/liquid separation. The separated aluminum hydroxide cake (liquor content, 24.9% by weight) was introduced into the washing step G for the seed. The cake was added into 800 ml of hot water (60° C.). After the dissolution of sodium oxalate contained in the cake into the hot water with stirring, 880 ml of the filtrate (50° C.; Na₂O, 23 g/l.; sodium oxalate content, 14 g/l.) was obtained by filtration.

Thereafter, (1) 170 ml of the filtrate which was obtained in the step G was poured through a dotted line 23 shown in FIG. 1 onto the aluminum hydroxide cake as seed vacuum-filtered at 60° C. from one liter of the slurry, which was obtained at the classification step of seed aluminum hydroxide (the step E shown in FIG. 1), and sodium aluminate in the cake was recovered by suction-filtering.

Then, the filtered cake was introduced into the washing step G for the seed aluminum hydroxide. The cake was added into 400 ml of hot water (60° C.), and sodium oxalate contained in the cake was dissolved in the hot water with stirring. After filtration, 580 ml of the filtrate was obtained. Furthermore, this operation (1) described above, was repeated six times.

Analytical results of the filtrate in each operation are shown in Table 3.

Table 3

| Times of washing operation | Analysis of filtrate | | Ratio of Na₂O/ sodium oxalate |
|---|---|---|---|
|  | Na₂O (g/l) | Sodium oxalate (g/l) |  |
| 0 | 23.0 | 14.0 | 1.64 |
| 1 | 10.3 | 25.5 | 0.40 |
| 2 | 7.0 | 28.6 | 0.24 |
| 3 | 6.1 | 29.7 | 0.21 |
| 4 | 5.9 | 30.0 | 0.20 |

Table 3-continued

| Times of washing operation | Analysis of filtrate | | Ratio of Na₂O/ sodium oxalate |
|---|---|---|---|
| | Na$_2$O (g/l) | Sodium oxalate (g/l) | |
| 5 | 5.8 | 30.1 | 0.19 |
| 6 | 5.9 | 30.0 | 0.20 |

It is apparent from Table 3 that, according to the present invention, a dilute sodium aluminate solution containing sodium oxalate, for example one obtained from the washing step G of aluminum hydroxide as seed, can be used for the seed washing for the recovery of caustic. As a result, a substantial amount of valuable sodium aluminate can be recovered without addition of fresh water for the recovery of caustic, and besides sodium oxalate deposited on the seed aluminum hydroxide can substantially be removed therefrom.

What is claimed is:

1. In a process for separating precipitated aluminum hydroxide from a sodium aluminate solution by adding aluminum hydroxide as seed to a clarified aqueous solution of sodium aluminate to precipitate aluminum hydroxide, recycling a portion of the precipitated aluminum hydroxide, as seed, to the precipitation step for aluminum hydroxide, and washing the remaining portion of precipitated aluminum hydroxide, thereby withdrawing said aluminum hydroxide as product, an improvement for effectively and economically recovering caustic components and removing sodium oxalate contaminant from the seed aluminum hydroxide which comprises washing the seed aluminum hydroxide with a washing liquor having a substantially saturated concentration of sodium oxalate and little content of caustic to recover accompanying sodium aluminate therein, and secondly washing the seed with hot water, then recycling as seed for the precipitation step of aluminum hydroxide.

2. The process according to claim 1, wherein said washing liquor is one having a caustic concentration of 50 g/l. or less (as Na$_2$O) and a saturation degree of 0.5 or more of sodium oxalate.

3. The process according to claim 2, wherein said washing liquor is one having a saturation degree of 0.7 or more.

4. The process according to claim 1, wherein said washing liquor is a recovered washing liquor withdrawn from the washing of product aluminum hydroxide.

5. The process according to claim 4, wherein the recovered washing liquor is cooled to a condition having a substantially saturated concentration of sodium oxalate.

6. The process according to claim 1, wherein said hot water has a temperature of from 50° to 90° C.

* * * * *